UNITED STATES PATENT OFFICE.

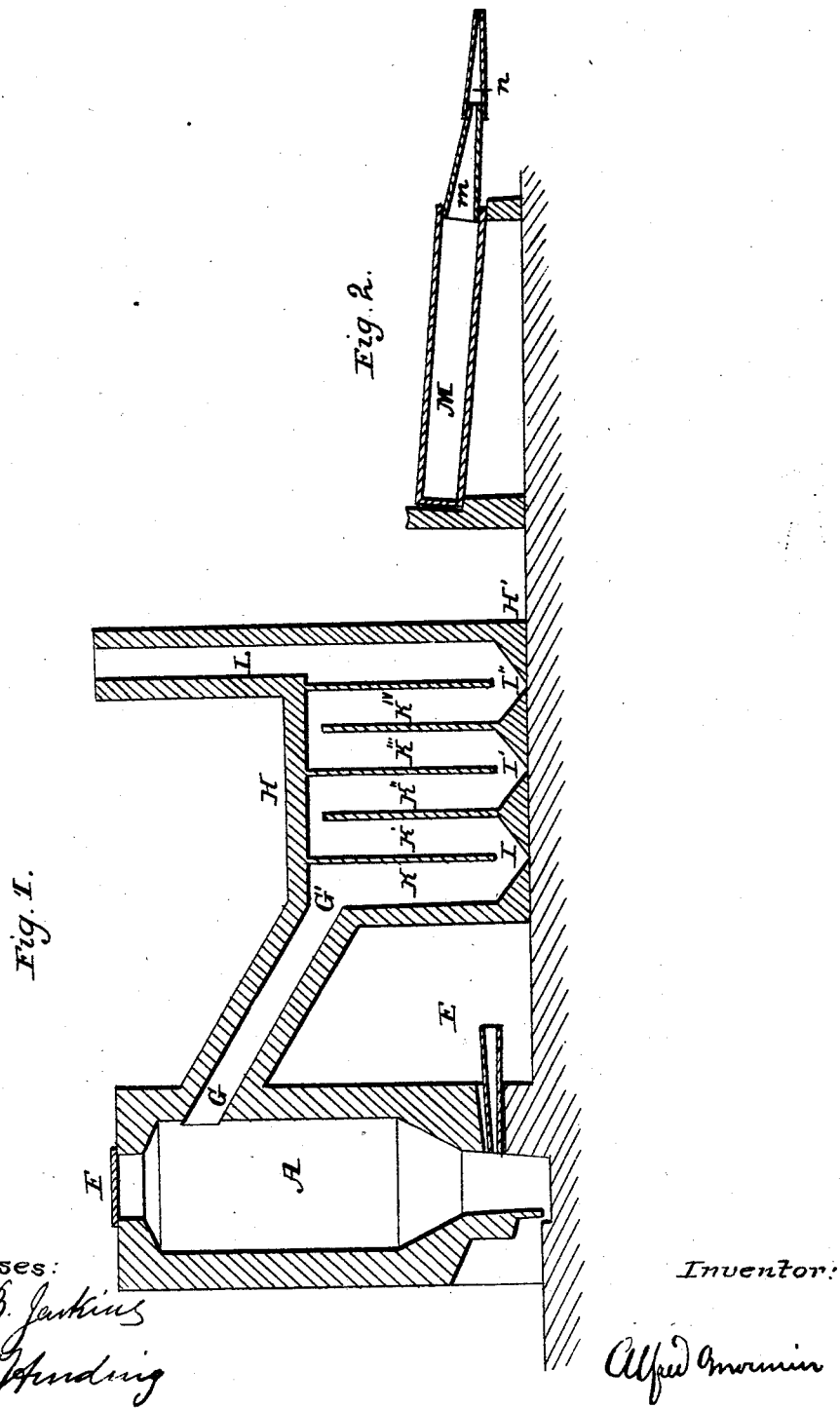

ALFRED MONNIER, OF CAMDEN, NEW JERSEY.

IMPROVEMENT IN MANUFACTURE OF METALLIC ZINC.

Specification forming part of Letters Patent No. 20,291, dated May 18, 1858.

*To all whom it may concern:*

Be it known that I, ALFRED MONNIER, of the city of Camden and State of New Jersey, have invented a new and useful Improvement in the Manufacture of Metallic Zinc from the Ore; and I do hereby declare the following to be a full and exact description of the same, reference being had to the annexed drawings, making a part of this specification, in which—

Figure 1 represents a vertical section of the apparatus for carrying on the first half of my process, and Fig. 2 represents the apparatus for finishing the process.

Heretofore in the manufacture of zinc from the native or impure ores it has been always customary to manufacture metallic zinc in a single process by heating the native ore and carbon mixed together in a muffle or retort, the ore having undergone no treatment preliminary to being mixed with carbon and placed in the muffle or retort, except merely the application of the low degree of heat required for driving off water, carbonic acid, or sulphur. The gangue or earthy impurities remain with the ore united with the zinc, and when that ore was placed in the muffle or retort with carbon it was necessary, in order to reduce it and obtain metallic zinc, to apply to the mixture a very high degree of heat and maintain it for a considerable length of time, in order to reduce the zinc disseminated through the mass of gangue. It was also necessary to crush the ore very fine before it was introduced into the muffle or retort. This high degree of heat and its long continuance destroys the muffles or retorts, besides consuming a large amount of fuel.

My improvement consists in obtaining metallic zinc by a combination of two metallurgic operations: First, by separating the gangue from the rest of the ore as a preliminary operation, or by applying to the ore a degree of heat such as would separate the oxide of zinc, or a large proportion of it, from the gangue, or by treating the ore with heat in connection with lime or other flux, the more effectually to remove the gangue; and, secondly, in heating the impure oxide of zinc by heat and carbon in a suitable retort or muffle and obtaining therefrom metallic zinc. Instead, therefore, of using a muffle or closed retort in the first instance, I use a blast-furnace, such as shown at A, Fig. 1. It has a solid hearth, a tuyere at E, and a cap at F, for introducing the charges. It should be about fifteen feet high and about four feet in diameter. The ore is introduced into this furnace through the movable cap F in its native state, or after it has been roasted or dried, as is ordinarily done, in order to remove the water, carbonic acid, or sulphur. I put into the furnace with the ore sufficient fuel and apply a sufficient blast by tuyere to develop heat enough to cause the oxide of zinc in an impure state mixed with pure oxide to pass off from the gangue. The oxide of zinc and other volatile matters which are evolved pass to the top of the furnace and then are conducted by the descending tube G G' into the chamber H H', which has its bottom formed into a series of troughs, and also has a series of corresponding partitions, K K' K'' K''' K$^{IV}$, which extend alternately from the top to within a short distance of the bottom, and from the bottom to within a short distance of the top. The oxide of zinc and other matters separated by the heat are thus made to pursue a tortuous course and to deposit in the troughs, from which they can afterward be collected and removed through small apertures I I' I'' in the sides of the troughs. The refuse gaseous products finally escape through the chimney L. I prefer, however, in all cases to introduce in the first instance into the blast-furnace, along with the ore and coal, lime- or other flux, in the proportion to the silica contained in the ore, varying according to the quantity of silica or other earthy material in the ore. This flux unites with the slag, removes the gangue, and greatly facilitates the separation of the oxide of zinc from the gangue. The construction of the furnace and mode of removing the oxide by the tube G G' is the same as above described when the flux is employed. After having collected the oxide of zinc and other matters evolved from the blast-furnace at the apertures I I' I'', I place them in a close retort, M, Fig. 2, with carbon, in the proportion of one of carbon to two of the oxide of zinc. Heat is applied by a furnace below the retort in the ordinary manner. The retort terminates in a conical receiver, $m$, and a smaller receiver, $n$, from which it is removed in the ordinary manner.

The advantages of my obtaining the metallic zinc by the combination of the two operations as above described are that the gangue being removed in the first instance in the blast-furnace, the heat required in the muffle for the reduction of the oxide, when separated, is much less, and the durability of the muffle is greatly increased over the old process.

When I use the term "carbon," I mean either charcoal, anthracite coal, or bituminous coal, either of which will answer.

Having thus described my invention, what I claim, and desire to secure by Letters Patent, is—

The process of obtaining metallic zinc from its ores by means of the combined metallurgic operations, substantially as above described.

ALFRED MONNIER.

Witnesses:
GEO. HARDING,
J. H. B. JENKINS.